Sept. 20, 1949.  R. W. YOUNG ET AL  2,482,531
ANTIDETONATION SYSTEM
Filed Oct. 21, 1944  3 Sheets-Sheet 1
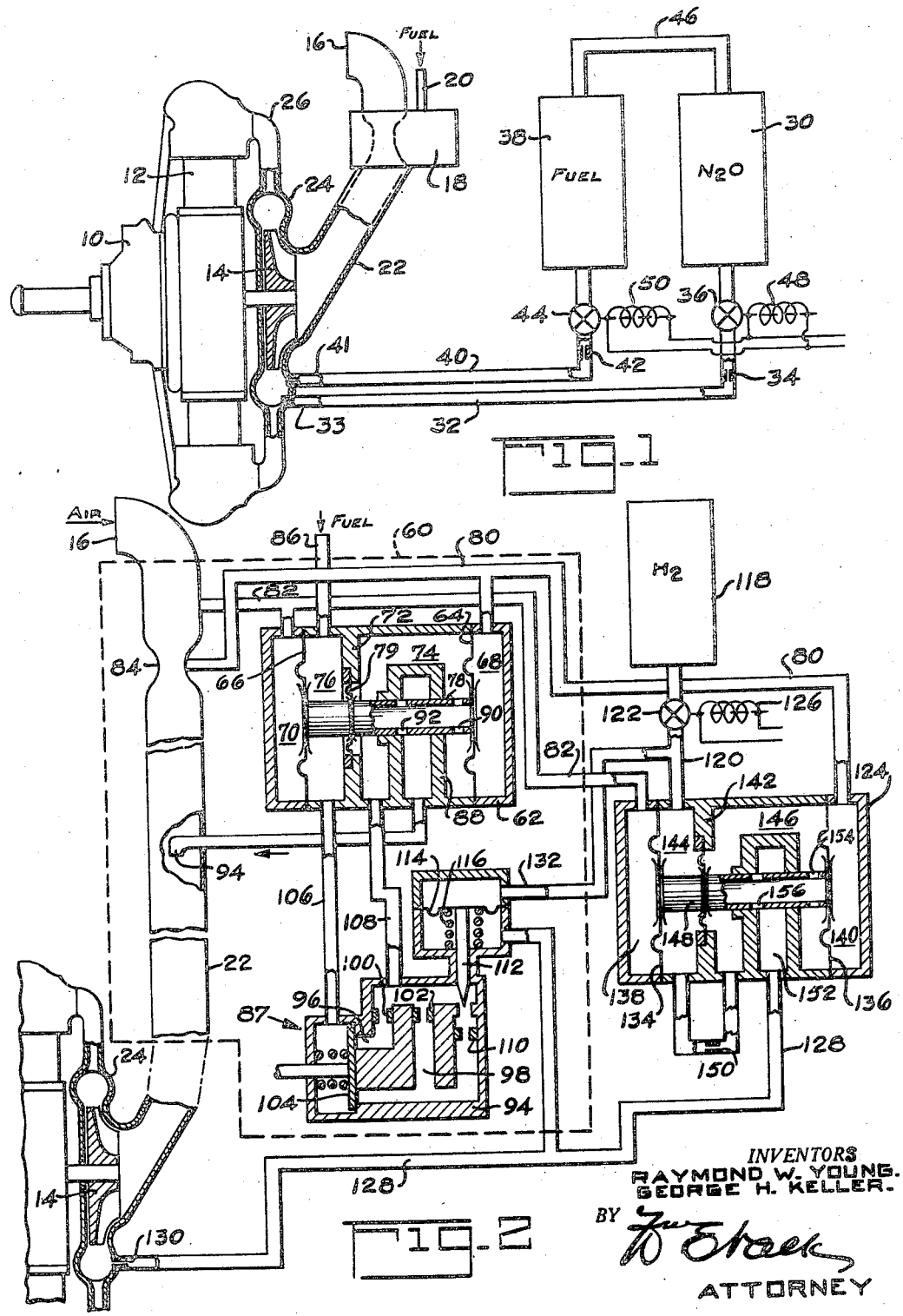
INVENTORS
RAYMOND W. YOUNG.
GEORGE H. KELLER.
BY
ATTORNEY

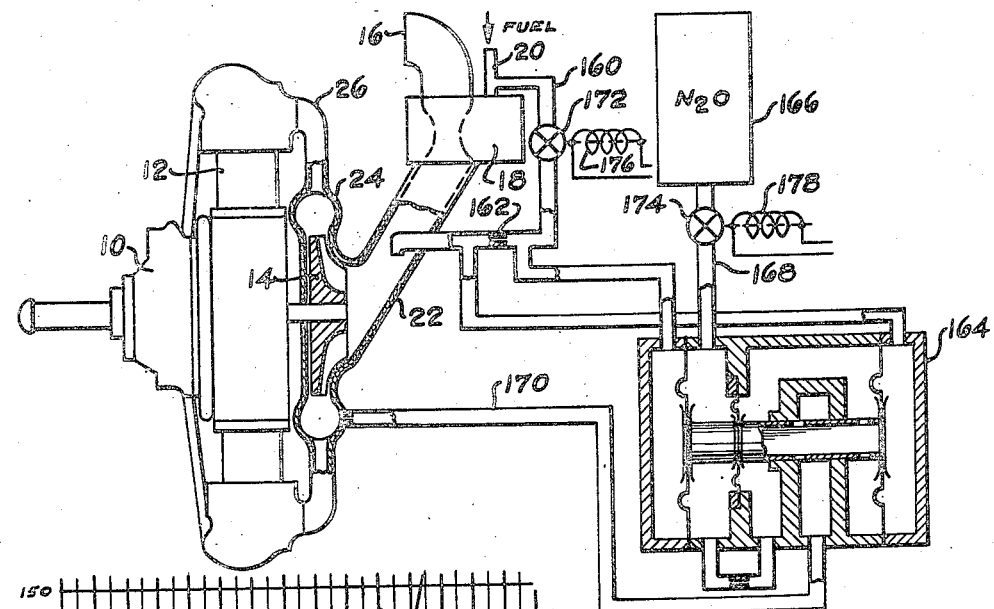
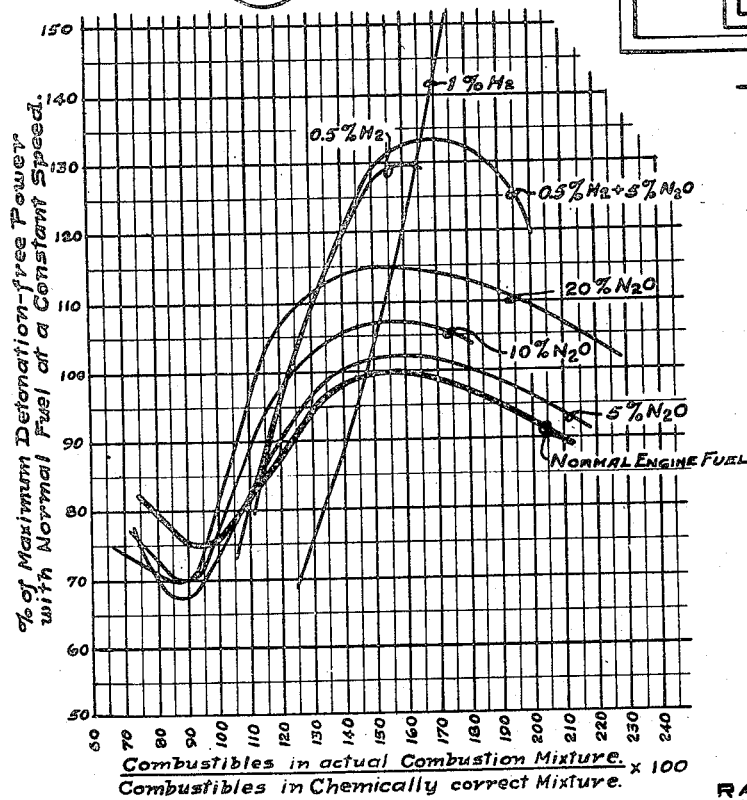

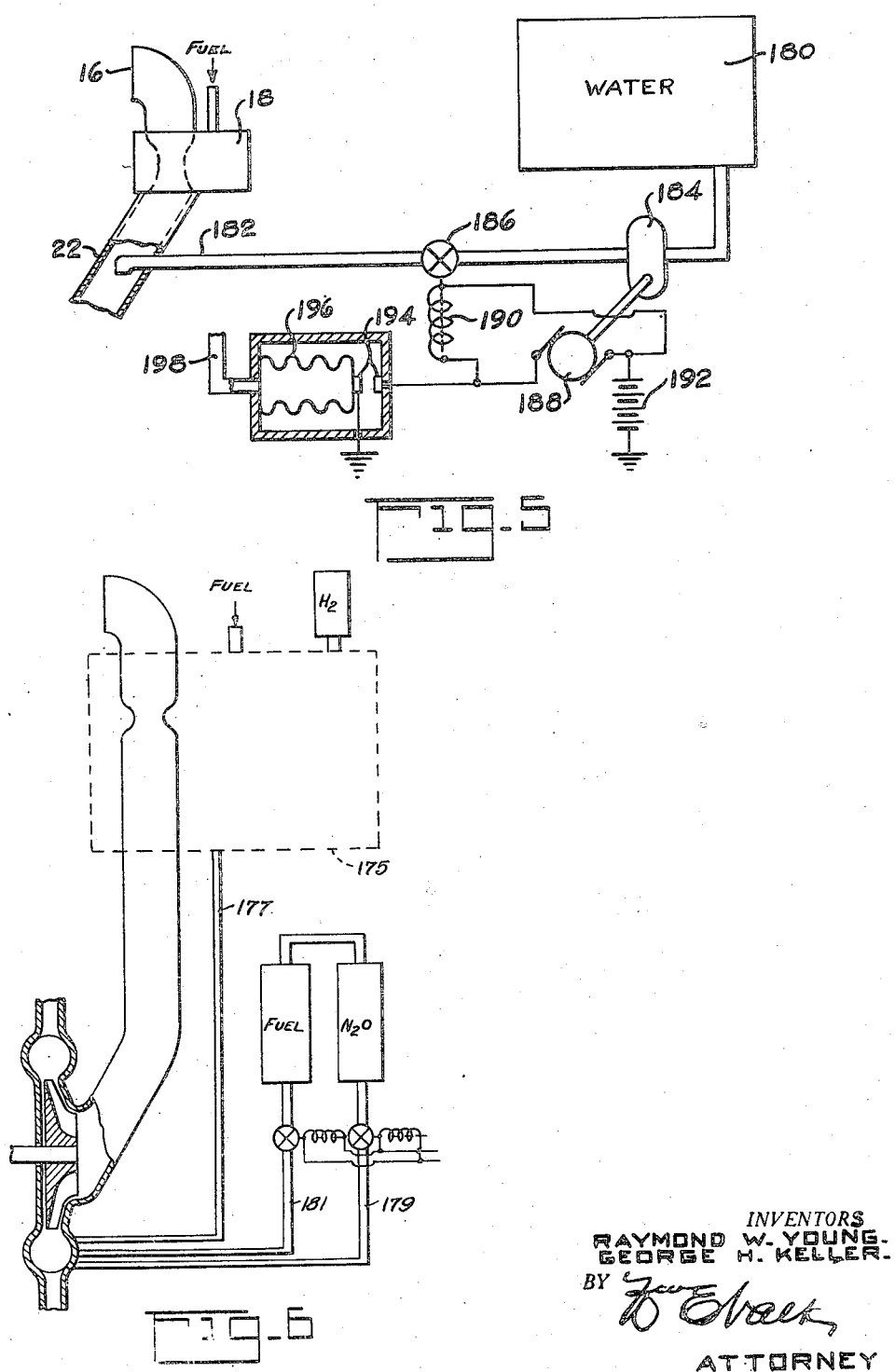

Patented Sept. 20, 1949

2,482,531

UNITED STATES PATENT OFFICE 2,482,531

ANTIDETONATION SYSTEM

Raymond W. Young, Hohokus, and George H. Keller, Radburn, N. J., assignors to Wright Aeronautical Corporation, a corporation of New York Application October 21, 1944, Serial No. 559,742

15 Claims. (Cl. 123—119)

This invention relates to internal combustion engines and is directed to a method of operating an internal combustion engine and to means for inhibiting detonation of such engines at high power outputs.

The maximum power available from an internal combustion engine generally is limited by detonation of the engine and it is known that the range of detonation-free engine power of an internal combustion engine can be increased by the addition of liquids such as water and/or alcohol into the engine induction system. However, e. g., in the case of an aircraft engine, as the altitude of engine operation increases, a point is reached where, because of the low density of the air, it is no longer possible to supercharge the engine intake charge sufficiently to reach the maximum limit of detonation-free power. In other words, at high altitudes, the maximum engine power is limited by the low density of the air rather than by detonation within the engine. Accordingly, it has been proposed to carry a separate supply of oxygen along with the aircraft and to introduce this oxygen into the engine induction system at high altitudes when more power is desired. However, it has been found that increasing the percentage of oxygen in the air supplied to the internal combustion engine in this manner substantially decreases the range of detonation-free power of the engine. Therefore, it has not proved possible to increase the maximum available engine power at high altitudes by adding oxygen as such to the air supplied to the engine. However, applicants have found that the addition of nitrous oxide ($N_2O$) into the engine induction system supplies oxygen for combustion within the engine thereby permitting a substantial increase in engine power without increasing the engine manifold pressure, and at the same time the addition of $N_2O$ into the engine induction system increases the detonation-free power range of the engine. Accordingly, it is an object of this invention to provide means for selectively introducing $N_2O$ into the engine induction system particularly for limited periods of time.

Applicants have also found that the addition of hydrogen ($H_2O$) into the engine induction system at rich combustion mixtures greatly increases the range of detonation-free engine power. It is known that the injection of $H_2$ to inhibit detonation has been tried in the past, but as far as applicants are aware, such attempts have all been failures because $H_2$ has been introduced at relatively lean fuel mixtures. However, applicants have found that with rich fuel mixtures, the range of detonation-free engine power is greatly increased by the addition of $H_2$ into the engine induction system. Accordingly, it is a further object of this invention to provide means for injecting $H_2$ into the engine induction system at rich fuel mixtures.

Although the addition of $H_2$ to the engine induction system increases the range of detonation-free engine power, injection of $H_2$ will not help above altitudes at which the maximum engine power is limited by the small amount of oxygen available rather than by detonation of the engine. Accordingly, it is a further object of this invention to inject $H_2$ into the engine induction system in conjunction with $N_2O$ which supplies the added oxygen needed at high altitudes.

Injection of $N_2O$ into the engine induction system not only inhibits detonation of the engine but also supplies the engine with added oxygen for combustion since this compound is quite unstable and breaks down into its elements within the engine. Accordingly, it is a further object of this invention to supply extra fuel to the engine simultaneously with the introduction of $N_2O$ and to properly proportion this extra fuel and $N_2O$. Similarly, when $H_2$ is introduced into the engine, extra air or oxygen are added to burn this $H_2$. To this end the ratio of the normal engine fuel to air supply is decreased thereby leaving air to burn the $H_2$.

Although the introduction of $H_2$ or $N_2O$ or a combination thereof permits high power engine operation without detonation, the engine will run considerably warmer at these high powers. Therefore, it is a further feature of this invention to introduce water or some other suitable liquid into the engine induction system in combination with the introduction of $H_2O$ or $N_2O$, the subsequent vaporization of the water or other liquid being operative to cool the engine.

Other objects of this invention will become apparent upon reading the annexed detailed description in connection with the drawing in which:

Figure 1 is a schematic view of a system for selectively introducing $N_2O$ into an internal combustion engine;

Figure 2 is a schematic view of a system for selectively introducing $H_2$ into an internal combustion engine;

Figure 3 is a modification of Figure 1;

Figure 4 is a graphical representation of the increase in detonation-free power resulting from the addition of various percentages of $N_2O$ and $H_2$ at varying fuel mixtures;

Figure 5 schematically discloses means for introducing water into the engine; and Figure 6 is a schematic view illustrating a combination of the systems of Figures 1 and 2.

Referring first to Figure 1, a conventional radial cylinder internal combustion engine is illustrated at 10 and comprises a plurality of radially disposed cylinders 12 and a supercharger 14 driven by the engine. The air for the engine induction system is taken in through an air scoop 16 and passes through a carburetor 18 which proportions thereto the regular or normal engine fuel which is fed under pressure to the carburetor 18 through conduit 20. The combustion air passes from the carburetor through an air intake duct or so-called carburetor adapted 22 to the intake of the supercharger 14 which delivers the combustion air to an annular intake manifold 24 from which the air is fed to the various engine cylinders through intake pipes 26. The regular fuel supply 20 controlled by the carburetor 18 may be injected into the engine induction system at the carburetor or, as in a so-called fuel injection system, directly into the engine cylinders. The structure so far described is quite conventional.

$N_2O$ is stored in a container 30 at a pressure sufficient to maintain it in a liquid state, e. g., 600 lbs. per square inch. A conduit 32 having a restricted orifice 34 connects the container 30 with the intake manifold 24 through a valve 36. The added fuel required by the $N_2O$ preferably is similar to the fuel supply 20 but is stored in a separate container 38 and a conduit 40 having a restricted orifice 42 connects the conduit 38 with the engine intake manifold 24 through a valve 44. A conduit 46 interconnects the top of the containers 30 and 38 whereby they are maintained at the same pressure. With this construction, the $N_2O$ and its fuel are both under the same pressure and by providing orifices 34 and 42 of proper relative size, the proper proportion of $N_2O$ and additional fuel will be introduced into the engine. Preferably, conduits 32 and 40 terminate at the intake manifold 24 in a plurality of suitable discharge nozzles 33 and 41 symmetrically disposed about the intake manifold 24. Valves 36 and 40 may be controlled by solenoids 48 and 50 respectively, whereby they may be simultaneously operated from a remote point. Also, these valves 36 and 44 preferably are of the pressure regulating type, that is, they maintain a substantially constant discharge pressure, whereby the rate of flow through conduits 32 and 40 is substantially independent of the quantity of $N_2O$ and fuel remaining in containers 30 and 38 respectively.

It has also been found that introduction of $H_2$ into the engine induction system at rich fuel mixtures greatly increases the range of detonation-free power available from the engine. When $H_2$ is introduced into the engine it is necessary to also provide air for the combustion of the $H_2$. Figure 2 schematically illustrates such a system.

Figure 2 discloses the induction system of Figure 1 including the air scoop 16, intake air duct 22 and supercharger 14, but a carburetor 60 disposed within the dashed outline has been substituted for the carburetor 18 of Figure 1. In addition, Figure 2 discloses means for regulating the quantity of $H_2$ introduced into the engine. The carburetor 60 includes a housing 62 having a pair of flexible diaphragms 64 and 66 extending thereacross and respectively defining therewith a pair of end chambers 68 and 70. A rigid intermediate partition 72 extends across the housing 62 and with the flexible diaphragms defines a pair of intermediate chambers 74 and 76. A slide valve 78 extends through the partition 72 and connects the flexible diaphragms 64 and 66 for joint movement. A small flexible diaphragm 79 provides a seal between the slide valve 78 and partition 72.

The end chambers 68 and 70 are respectively connected by conduits 80 and 82 to the throat and barrel of a venturi 84 in the air intake duct such that the outer sides of the flexible diaphragms are subjected to a pressure differential proportional to the engine intake air flow for urging the valve 78 to the right as viewed in Figure 2. The normal engine fuel is admitted under pressure to the intermediate chamber 76 through conduit 86 and thence to the intermediate chamber 74 through a restricted orifice or orifices of a mixture control device 87 hereinafter described. The slide valve 78 is hollow and extends through a dome-like chamber 88 within the intermediate chamber 74. Fuel is admitted through openings 90 into the interior of the slide valve 78 from the intermediate chamber 74 and thence into the chamber 88 through metering openings 92 from which the fuel discharges into the airstream, through the discharge nozzle 94. With this construction, the fuel pressure within the intermediate chambers 74 and 76 subjects the inner sides of the flexible diaphragms 64 and 66 to a pressure differential proportional to the fuel flow to balance the pressure differential acting on the outer sides of the flexible diaphragms. Thus, the fuel pressure and air pressure differentials acting on the flexible diaphragms 64 and 66 are effective to position the slide valve 78 so that the valve openings 92 meter the fuel flow in proportion to the air flow. Compensation for variation in the density of the air with altitude may be obtained by adjusting the venturi 84, e. g., as disclosed in application Serial No. 492,188, filed by F. J. Wiegand et al. on June 23, 1943 and now abandoned.

The mixture control device 87 comprises a housing 94 having a pair of parallel fuel passages 96 and 98 with restricted orifices 100 and 102 respectively. A mixture control disc 104 is provided with openings (not shown) such that fuel is admitted from intermediate chamber 76 through passage 106 and thence either through both restricted orifices 100 and 102 or only through restricted orifice 102 to the intermediate chamber 74 through passage 108 depending on the rotative position of the disc 104. With this arrangement, with both orifices 100 and 102 open to fuel flow, the carburetor operates to provide a rich fuel mixture, whereas with restricted orifice 100 closed, a relatively lean fuel mixture is provided.

The carburetor 18 illustrated in Figure 1 may be similar to the aforedescribed construction of carburetor 60. In addition, in Figure 2, a restricted orifice 110 and a serially disposed valve 112 are arranged in parallel with restricted orifice 102. With this arrangement, when valve 112 moves in a closing direction, the mixture control device 87 offers an increased resistance to the fuel flow therethrough and therefore a smaller fuel flow will produce the necessary fuel pressure differential between chambers 74 and 76 to balance the air flow pressure differential. Thus movement of valve 112 in a closing direction results in a decrease in the rate of fuel flow through conduit 86 relative to the air flow. The valve 112 is supported by a flexible diaphragm 114 and is urged to a normal open position by a spring 116. As hereinafter described, the valve 112 is automatically closed upon the introduction of $H_2$ into the engine, thereby decreasing the rate of fuel supply into the engine through conduit 86 relative to the rate of air supply, the excess air burning the $H_2$.

The $H_2$ is stored in a container 118 preferably at pressures in excess of 2,000 lbs. per square inch. The $H_2$ in container 118 is connected through a conduit 120 and a valve 122 to a proportioning device 124 which may be quite similar to the carburetor 60. The valve 122 is opened in response to energization of solenoid 126 and like valves 36 and 44 of Figure 1, preferably automatically maintains a substantially constant discharge pressure. From the proportioning device 124, the $H_2$ flows through a conduit 128 and thence through suitable discharge nozzles 130 into the annular intake manifold 124. Preferably a plurality of nozzles 130 are provided and these nozzles are symmetrically disposed about the manifold 24. Also a conduit 132 establishes communication between the conduit 120, downstream of the valve 122 and the rear side of the flexible diaphragm 114 whereby when the valve 122 is opened to introduce $H_2$ into the engine, the $H_2$ pressure is transmitted to the rear side of diaphragms 114 to close valve 112, the other side of diaphragm 114 being connected to conduit 128.

The proportioning device 124 comprises a housing having a pair of flexible diaphragms 134 and 136 extending thereacross and defining therewith a pair of end chambers 138 and 140. A fixed partition 142 between the flexible diaphragms 134 and 136 defines therewith a pair of intermediate chambers 144 and 146. A slide valve 148 extends through the partition 142 to connect the flexible diaphragms together for joint movement.

The conduit 120 from the $H_2$ container opens into the intermediate chamber 144 from which $H_2$ flows through a restricted orifice 150 to the intermediate chamber 146. The intermediate chamber 146 is provided with dome-like discharge chamber 152 through which the valve 148 is adapted to be moved by the diaphragms 134 and 136. The valve 148 is hollow and is provided with radial openings 154 through which $H_2$ enters the valve. The valve is also provided with metering holes 156 opening into the discharge chamber 152. In this way the position of the valve 148 determines the rate of discharge of $H_2$ into the engine induction system. The $H_2$ pressure differential produced by the orifice 150 acts against the inner sides of the flexible diaphragms 134 and 136 and is balanced against an air pressure differential acting against the outer sides of the flexible diaphragms 134 and 136 which respectively are in communication with the throat and barrel of the venturi 84 through conduits 82 and 80.

With this arrangement, when the $H_2$ control valve 122 is closed, the carburetor 60 operates to meter the regular engine fuel in proportion to the air flow in the conventional manner, the position of the mixture control disc 104 determining the fuel-air ratio. When the valve 128 is opened to introduce $H_2$ into the engine, valve 112 closes to reduce the ratio of the rate at which fuel is supplied through conduit 86 relative to the rate of air flow, and at the same time the regulating device 124 automatically controls the quantity of $H_2$ introduced into the engine. By proper selection of the size of the metering orifices 100, 102, 110 and 150, the quantity of air used to burn the $H_2$ introduced into the engine can be made equal to that required to burn the additional fuel supplied through conduit 86 prior to the introduction of the $H_2$.

It has also been found that such gases as $N_2$ and $CO_2$ when introduced into the engine induction system, also inhibit detonation particularly at relatively lean fuel mixtures. Obviously the system of Figure 2 may be used for introducing $N_2$ or $CO_2$ instead of $H_2$ into the engine. However, since $N_2$ and $CO_2$ unlike $H_2$ are non-combustibles when the system of Figure 2 is used for introducing $N_2$ or $CO_2$, the valve 112 is not provided.

The system of Figure 2 may also be modified for the introduction of $N_2O$ into the engine instead of $H_2$, but the operation of valve 112 would have to be reversed, that is, valve 112 would then be arranged to close when $N_2O$ is introduced, thereby increasing the fuel supplied through conduit 86 in order to furnish additional fuel in proportion to the oxygen introduced into the engine by the $N_2O$. This arrangement eliminates the special fuel container 38 of Figure 1.

Also, the $N_2O$ may be metered in proportion to extra fuel supplied through a conduit branching off from the regular fuel supply. Figure 3 illustrates such a system. As in Figure 1, the carburetor 18 automatically operates to vary the normal or regular engine fuel supplied under pressure through conduit 20 in proportion to the rate of air flow through the air scoop 16 and intake duct 22. However, instead of providing an extra fuel container as in Figure 1, the additional fuel supplied with the $N_2O$ is fed through a branch conduit 160, having a restricted orifice 162 and discharging into the air intake duct 22. A suitable proportioning device 164 uses the fuel pressure differential across the restricted orifice 162 to meter the $N_2O$ in proportion thereto. The proportioning device 164 may be similar to the proportioning device 124 of Figure 2, and therefore needs no further description. The $N_2O$ is stored in a container 166 from which it can be fed into the engine induction system at the intake manifold 24 through conduit 168, proportioning device 164 and conduit 170. Valves 172 and 174 are disposed in conduits 160 and 168 and solenoids 176 and 178 respectively are adapted to be energized to open these valves in order to effect introduction of $N_2O$ into the engine. With this construction, when valves 172 and 174 are opened, $N_2O$ and extra fuel in proportion thereto are introduced into the engine, thereby increasing the detonation-free power range of the engine.

It is also desirable to introduce $H_2$ and $N_2O$ simultaneously into an engine induction system. This may be accomplished by combining the systems of Figure 1 or 3 with that of Figure 2, that is, by replacing carburetor 18 in Figure 1 or 3 with the carburetor 60 and the $H_2$ proportioning device 124 of Figure 2 or conversely by adding the $N_2O$ control of Figure 1 or 3 to Figure 2. With either of these combinations when the solenoid valves are opened, the regular fuel $H_2$, $N_2O$, and air are all introduced into the engine induction system in proper proportions. Figure 6 illustrates such a combination of Figures 1 and 2. In this figure, $H_2$ and the regular engine fuel are introduced into the engine under control of the apparatus schematically represented at 175, this apparatus being similar to that illustrated in Figure 2. Thus $H_2$ is introduced into the engine intake manifold through a conduit 177. In addition in Figure 6, $N_2O$ and additional fuel are introduced into the engine intake manifold in a manner similar to that illustrated in Figure 1, the N₂O and fuel being supplied through conduits 179 and 181 respectively.

The addition of N₂O to the engine induction system not only increases the range of detonation-free power available, but in addition, because of the oxygen introduced into the engine by the N₂O, it is possible to increase the engine power merely by adding extra fuel without any increase in the engine intake manifold pressure. This latter feature is particularly important at high altitude operations where the maximum available engine power is limited by the low density of the surrounding atmosphere rather than by detonation of the engine. The effect of the addition of H₂ into the engine induction system is quite unexpected because at relatively lean fuel mixtures the range of detonation-free power is greatly reduced by the addition of H₂. However, when H₂ is introduced into the engine at relatively rich fuel mixtures, the range of detonation-free engine power is greatly increased. Accordingly, H₂ should only be introduced into an internal combustion engine at relatively rich fuel mixtures, the necessary richness of the fuel mixture depending largely on the percentage of H₂ introduced. Thus in Figure 2 the fuel mixture control disc 104 is adjusted for a rich fuel mixture prior to opening valve 122.

The effect of the introduction of H₂ and N₂O into an internal combustion engine is graphically illustrated in Figure 4. As indicated, in this figure the heavy curve illustrates the upper limit of the detonation-free power range with variation in the quality of the fuel mixture of a particular internal combustion engine operating on a normal gasoline engine fuel. The other curves of Figure 4 illustrate the upper limit of the detonation-free power range of this engine when various amounts of N₂O or H₂ and a combination of N₂O and H₂ are introduced into the engine equal to the indicated percentages of the weight of the airflow. As is apparent from the curves, both N₂O and H₂ and their combination when introduced in the engine, increase the range of detonation-free power of the engine except at lean fuel mixtures and the larger the quantity of N₂O or H₂ introduced, the larger is the increase in the range of detonation-free power of the engine. However, in the case of H₂, if, e. g., there is more than 30% excess fuel (indicated at 130 along the horizontal axis of the curves) then the introduction of H₂ equal to 0.5% of the weight of the airflow results in a very great increase in the detonation-free power range of the engine. If the percentage of H₂ introduced is increased, the fuel mixture must be made even richer, but the increase in the range of detonation-free power of the engine is even larger.

When the engine is operating at the high powers permitted by the introduction of an anti-detonant such as H₂ or N₂O, then the operating temperature of the engine may rise appreciably. In order to reduce this temperature, a liquid such as water may be introduced into the engine cylinders, the head absorbed in vaporizing the water thereby helping to reduce the engine operating temperature. To this end the arrangement of Figure 5 is provided for introducing water into the engine. A water supply tank 180 is connected to a discharge conduit 182 having a serially disposed pump 184 and a valve 186. The conduit 182 terminates in a suitable nozzle (not shown) in the engine intake duct 22 upstream of the supercharger 14. The pump 184 is drivably connected to an electric motor 188 and the valve 186 is adapted to be opened by a solenoid 190. The electric motor 188 and solenoid 190 are connected in parallel with a source of electric energy 192 and a switch 194 such that closure of the switch effects operation of the pump 184 and simultaneously opens the valve 186. The switch 194 is controlled by a bellows 196 and a conduit 198 is connected to the interior of this bellows. With the system of Figure 1, the conduit 198 is connected to conduit 32 between orifice 34 and valve 36, whereby when N₂O is introduced into the engine, the pressure of the N₂O is effective to close the switch 194 to effect a simultaneous introduction of water into the engine. Similarly with the system of Figure 2 or 3 the pressure of the H₂ or N₂O introduced into the engine may be used to expand the bellows 196 and close the switch 194 for effecting the introduction of water into the engine.

At this point it should be noted that where no air is available or the air supply is inadequate, the N₂O may furnish all the oxygen for combustion of the engine fuel. Also, other unstable compounds of nitrogen and oxygen may be used, e. g., nitrogen dioxide (NO₂). Also, it should be apparent that it is within the scope of this invention to provide means other than that herein specifically disclosed for providing the extra fuel or oxygen when N₂O or H₂ are introduced into the engine.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination with an internal combustion engine, means operative to supply a first fluid containing oxygen and a second fluid containing combustibles to said engine, and means operable to effect introduction of a third fluid into said engine, said third fluid inhibiting detonation within said engine and supplying oxygen for combustion within said engine.

2. In combination with an internal combustion engine, means operative to control the engine fuel-air ratio, means for supplying a fluid into said engine, said fluid upon introduction into said engine inhibiting detonation therein and supplying oxygen for combustion therein, means operable to effect introduction of said fluid into said engine, and means operable simultaneously with said introduction to increase the engine fuel-air ratio.

3. In combination with an internal combustion engine, means operative to supply a first fluid containing combustibles and a second fluid containing oxygen to said engine in desired ratio, means operable to effect introduction of a third fluid into said engine, said third fluid inhibiting detonation within said engine and supplying oxygen for combustion within said engine, and means automatically operative during said introduction to increase the ratio of the combustibles to said second fluid supplied to said engine.

4. In combination with an internal combustion engine having means for controlling the engine fuel-air ratio, means operative to effect introduction of nitrous oxide into said engine, and means to effect an increase in the engine fuel to air ratio during said introduction.

5. In combination with an internal combustion engine having means for controlling the ratio of the rate of supply of engine fuel to the rate of supply of air to said engine, means operative to effect introduction of an unstable compound of nitrogen and oxygen into said engine, and means to simultaneously effect an increase in the engine fuel to air ratio.

6. In combination with an internal combustion engine, means operative to proportion an oxygen containing fluid and a combustible containing fluid for said engine, means operative to effect introduction of a second combustible containing fluid into said engine, said second fluid being effective to inhibit detonation of said engine, and means automatically operative to decrease the ratio of said first combustible fluid to said oxygen containing fluid during said introduction.

7. In combination with an internal combustion engine having means to control the fuel-air ratio, and means for effecting the introduction of hydrogen into said engine at a fuel to air ratio which is sufficiently high that the introduction of hydrogen increases the detonation-free power range of said engine.

8. In combination with an internal combustion engine having means to control the ratio of the rate of supply of normal engine fuel to the rate of supply of air to said engine, means for effecting the introduction of hydrogen into said engine, and means operative simultaneously with said hydrogen introduction to effect a decrease in said ratio.

9. The method of operating an internal combustion engine comprising the steps of providing said engine with a rich fuel mixture and of introducing hydrogen into said engine, said fuel mixture being sufficiently rich that said introduction of hydrogen increases the detonation-free power range of the engine.

10. The method of operating an internal combustion engine comprising the step of simultaneously introducing hydrogen and an unstable compound of nitrogen and oxygen into said engine in addition to the normal engine fuel and air supply.

11. In combination with an internal combustion engine, a supply of normal engine fuel, means operative to control the introduction of said normal engine fuel and air into said engine, and means operable to effect the introduction of nitrous oxide and hydrogen into said engine in addition to said fuel and air.

12. In combination with an internal combustion engine, a supply of normal engine fuel, means operative to control the introduction of said normal engine fuel and air into said engine, and means operable to effect the introduction of hydrogen and an unstable compound of nitrogen and oxygen into said engine in addition to said fuel and air, and means to automatically control the ratio of the fuel and hydrogen to the air and said nitrogen compound supplied to said engine.

13. In combination with an internal combustion engine, means to supply a first fluid containing oxygen and a second fluid containing combustibles to said engine, means to effect introduction of a third fluid into said engine, said third fluid inhibiting detonation within said engine and supplying oxygen for combustion within said engine, and means for introducing water into said engine during introduction of said third fluid.

14. In combination with an internal combustion engine having means for controlling the engine fuel-air ratio, means to effect introduction of an unstable compound of nitrogen and oxygen into said engine, means to increase the engine fuel to air ratio during introduction of said nitrogen compound, and means to introduce water into said engine during introduction of said nitrogen compound.

15. In combination with an internal combustion engine having means to control the fuel-air ratio, means for effecting introduction of hydrogen into said engine at a fuel to air ratio which is sufficiently high that the introduction of hydrogen increases the detonation-free power range of the engine, and means for introducing water into said engine during said introduction of hydrogen.

RAYMOND W. YOUNG.
GEORGE H. KELLER.

REFERENCES CITED

The following references are of record in the file of this patent:

UNITED STATES PATENTS

| Number | Name | Date |
|---|---|---|
| 512,894 | Noteman | Jan. 16, 1894 |
| 1,665,621 | Chandler | Apr. 10, 1928 |
| 2,113,601 | Pratt | Apr. 12, 1938 |
| 2,113,602 | Pratt | Apr. 12, 1938 |
| 2,169,844 | Marshall, Jr. | Aug. 15, 1939 |

FOREIGN PATENTS

| Number | Country | Date |
|---|---|---|
| 167,831 | Great Britain | Aug. 12, 1921 |